C. KOHLER.
CONDENSER FOR LOCOMOTIVES.
APPLICATION FILED DEC. 10, 1919.
1,363,883.
Patented Dec. 28, 1920.
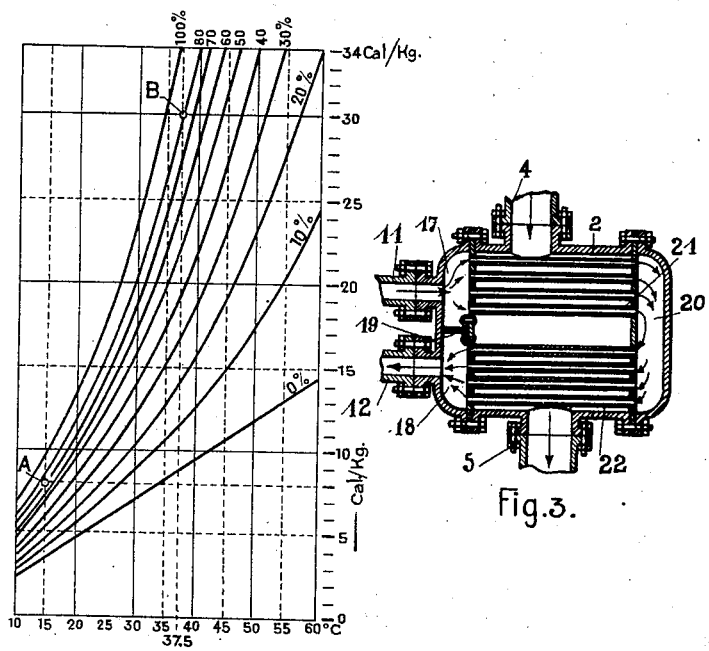
Fig. 1.
Fig. 3.
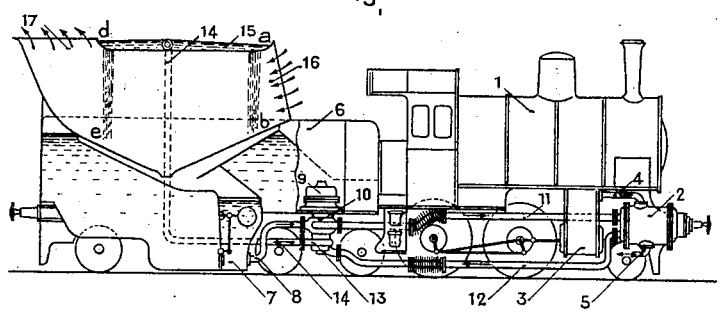
Fig. 2.
Inventor:
Conrad Kohler,
By Henry Orth
atty

UNITED STATES PATENT OFFICE.

CONRAD KOHLER, OF ZURICH, SWITZERLAND.

CONDENSERS FOR LOCOMOTIVES.

1,363,883.      Specification of Letters Patent.      Patented Dec. 28, 1920.

Application filed December 10, 1919. Serial No. 343,787.

*To all whom it may concern:*

Be it known that I, CONRAD KOHLER, a citizen of the Republic of Switzerland, residing at Zurich, Hardturmstrasse 19, Switzerland, have invented certain new and useful Improvements in Condensers for Locomotives; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to a surface-condensing plant with cross-current re-cooler for the water of condensation on steam driven vehicles. According to this invention the cooling water traverses in the course of each cycle described by it the surface condenser twice in its longitudinal direction, while it crosses only once the current of air which is produced in the cross-current re-cooler when the vehicle is traveling and with which it comes directly into contact. Thereby the arrangement is such that the water of condensation to be cooled passes in the course of each cycle in series through the surface condenser and the cross-current re-cooler.

In connection with surface condensers mounted on steam driven vehicles great difficulty has been met in re-cooling the cooling water used for the condensation down to the temperature which is required for an effective condensation and in guiding the cooling water in a proper manner through the surface-condenser so that not too much space, weight and driving power are needed for such an arrangement. A plant designed according to this invention attains the desired aim. A relatively large quantity of water conducted through the air-cooler allows a large transmission of heat from the heat carrier, *i. e.* from the cooling water, to the cooling air. The once re-cooled relatively large quantity of water is then able to take up in the condenser again a large quantity of heat and to convey the latter into the re-cooling contrivance where it is delivered to the air. In order that the quantity of water caused to circulate per unit of time is the greatest possible, the conditions constituting the subject matter of this invention must be fulfilled, particularly with regard to the passage through the surface-condenser. The whole system of connections of the novel plant is as simple as possible. Also with regard to the re-cooling, the new plant is in any case of simpler design than for instance a condensation plant in which a portion of the water conducted through the current of air is guided in the re-cooler above the air channel and is then repeatedly conducted through the current of air previous to its use in the surface condenser for cooling purposes. In such a case more pumps, pipe-connections, receptacles and the like are required. Compared with other condensing plants hitherto proposed, the new plant presents the advantage that the water to be cooled is brought into direct contact with the cooling air so that use can be made of the evaporating action of the cooling air and the best possible transmission of heat from the water to be cooled to the cooling air is secured.

The re-cooling devices, in which for instance a current of air produced in consequence of the traveling speed of the vehicle acts upon the water falling freely transversely through the current of air, present the drawback that a considerable amount of water is frequently entrained by the current of air which carries it out of the re-cooler so that it is no longer available for cooling purposes. It has been found by experience that the relative velocity between the current of air and the vehicle can not surpass the maximum value of 5m/sec. Consequently, only $5m^3$ of air at the outmost pass per second through each $m^2$ of the clear channel opening. When it is assumed that the specific volume of the air is under the prevailing pressure and volume-conditions that come into consideration $= 0.86 m^3/kg$, it will be seen that a quantity of air weighing $5 : 0.86 = 5.82$ kg/sec. passes through each $m^2$ of the admission section of the cooling zone. When the air entering into the cooling zone has for instance a temperature of 15° C. and a saturation of 70%, then it has according to known heat diagrams (see for instance the *Zeitschrift Deutscher Ingenieure* of 7. 1. 1905 page 11) a heat content of about 8

Cal/kg. Fig. 1 of the accompanying drawing illustrates a portion of such an entropy diagram. In this diagram the temperature is plotted as abscissæ, while as ordinate is plotted the quantity of heat (Cal.) contained in 1 kg. air at the degrees of saturation (in %) represented in the figure by different curves which ascend from the left hand lower side to the right hand upper side and designated with the corresponding saturation figures in %. A corresponds in Fig. 1 to the initial state of the air. When this air is heated in the re-cooler to 37.5° C. and when its saturation rises to 80% (point B in Fig. 1) its heat-content amounts at the outlet of the cooling zone to about 30 Cal/kg. Thus, the heat taken up by the air while it passes from the condition represented in Fig. 1 by the point A into the condition represented by the point B, amounts to (30—8)=22 Cal/kg. From this it follows, that the 5.82 kg. air, which in accordance with the above calculation, are passing per second through 1m² of the clear section of the cooling channel are capable of taking up a quantity of heat amounting to 5.82 times 22=127 Cal/sec. Owing to the fact that the height of fall available in a re-cooler mounted on a vehicle is very limited, the water can be cooled by 4° C. at the outmost. Consequently, at least 127:4 i. e. more than 30 kg/sec. of water have to be supplied for each m² of the inlet area of the cooling zone. It is intended to cause the so cooled quantity of water to circulate in a closed cycle through the surface-condenser and from the latter back into the re-cooler. In order to avoid too great dimensions and resistances in the surface-condenser the latter must be designed so that the water is not compelled to pass three or even four times, but only two times through it in its longitudinal direction. This involves in its turn the use of a large quantity of water when it is intended to attain a prescribed transmission of heat. In the re-cooler of the plant according to this invention the whole quantity of water passes in one sense through the current of air and for the sake of simplicity said water is caused to cross only once the current of air, it being compelled to restart hereupon the cycle.

The drawing illustrates diagrammatically in Figs. 1, 2 and 3 a mode of carrying the invention into effect, Fig. 2 being a side view of a steam locomotive fitted with the novel surface-condensing plant and Fig. 3 being a vertical longitudinal section through the surface-condenser. Beneath the front portion of the steam boiler 1 of the locomotive is arranged a surface condenser 2. Exhaust steam leaving the steam cylinder 3 is conducted into said condenser 2 through the pipe 4. The condensed steam is drawn off by a pump not shown through the pipe 5.

The condenser 2 has at one end two chambers 17, 18 separated from one another by a partition 19 and at the opposite end a chamber 20. A nest of tubes 21 effects a communication between the chambers 17 and 20 and a nest of tubes 22 between the chambers 20 and 18 respectively. The exhaust steam supplied to the condenser 2 flows around said tubes 21 and 22 while it traverses the condenser 2. To the rear end of the locomotive 1 is attached a tender 6 on which is mounted the re-cooling contrivance. The tender 6 contains a water tank 7. A pump 10 driven by an auxiliary turbine 9 and connected to the tank 7 by a pipe 8 draws off water from said tank 7 and forces it through the pipe 11 into the chamber 17 of the surface-condenser 2. The water passes then twice, and no more, in the longitudinal direction of the condenser 2 through it. Hereupon, said water passes from the chamber 18 of the condenser 2 into the pipe 12 and is then forced through the pipe 14 into an upper receptacle 15 by a pump 13 also receiving its drive from the auxiliary turbine 9. The water is discharged from said receptacle 15 in fine jets freely falling downward. Hereby, it comes into direct contact with the current of air produced in consequence of the traveling speed of the vehicle and is cooled. The air passes at 16 into a channel provided for this end and it leaves said channel at 17. The water collects in the lower portion of this channel and flows then into the receptacle 7 from where it is caused to restart the cycle by the pump 10. The cooling zone proper extends in the cooling channel from the vertical cross-section $a$—$b$ to the vertical cross-section $d$—$e$. In the first mentioned cross-section fall the first, and in the secondly mentioned cross-section fall the last water jets across the air channel passing at 16 into and at 17 out of the cooling channel. It will be seen, that in the course of each cycle, the water crosses only once the current of air in the air channel.

I claim:

1. A surface-condensing plant on steam driven vehicles, comprising a surface-condenser which the water of condensation is compelled to traverse in the course of each cycle twice in its longitudinal direction, an open re-cooler for the water of condensation in which a current of air is produced when the vehicle is traveling, and means for guiding the water of condensation from the surface condenser to the re-cooler and from the latter back into the surface condenser, the water of condensation being caused to cross in the course of each cycle once said current of air produced in the re-cooler.

2. A surface-condensing plant on steam driven vehicles, comprising a surface-condenser which the water of condensation traverses in the course of each cycle twice in its longitudinal direction, an open re-cooler for the water of condensation in which a current of air is produced when the vehicle is traveling, conduits guiding the water of condensation to be cooled into said re-cooler where it crosses once the current of air produced therein, conduits for guiding the water of condensation cooled by said current of air back into the surface-condenser, and means for forcing the water of condensation through said conduits.

In testimony that I claim the foregoing as my invention, I have signed my name.

CONRAD KOHLER.